United States Patent
Jin et al.

(10) Patent No.: US 10,838,223 B2
(45) Date of Patent: Nov. 17, 2020

(54) STEREOSCOPIC DISPLAY DEVICE HAVING A BARRIER PANEL

(71) Applicant: LG Display Co., Ltd., Seoul (KR)

(72) Inventors: You-Yong Jin, Seoul (KR); Wook Jeon, Daejeon (KR); Hee-Jin Im, Paju-si (KR); Yong-Ku Lee, Gimpo-si (KR); Ju-Hoon Jang, Paju-si (KR); Dong-Yeon Kim, Seoul (KR); Woon-Chan Moon, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/162,765

(22) Filed: Oct. 17, 2018

(65) Prior Publication Data

US 2019/0129194 A1    May 2, 2019

(30) Foreign Application Priority Data

Oct. 31, 2017    (KR) .................. 10-2017-0144062

(51) Int. Cl.
| | | |
|---|---|---|
| *H04N 13/04* | (2006.01) | |
| *G02B 30/27* | (2020.01) | |
| *G02F 1/1343* | (2006.01) | |
| *G09G 3/36* | (2006.01) | |

(52) U.S. Cl.
CPC ....... *G02B 30/27* (2020.01); *G02F 1/134309* (2013.01); *G09G 3/36* (2013.01)

(58) Field of Classification Search
CPC .............. H04N 13/31; G02B 27/2214; G02F 1/134309; G09G 3/36; H01L 27/1288; H01L 27/1225
See application file for complete search history.

(56) References Cited

U.S. PATENT DOCUMENTS

| | | | |
|---|---|---|---|
| 2010/0033642 A1* | 2/2010 | Kim ..................... | G02B 30/27 349/15 |
| 2012/0138965 A1* | 6/2012 | Choi ................... | H01L 27/1225 257/88 |
| 2013/0342586 A1 | 12/2013 | Kim et al. | |

(Continued)

FOREIGN PATENT DOCUMENTS

| | | |
|---|---|---|
| CN | 20248642 U | 10/2012 |
| CN | 102868895 A | 1/2013 |
| CN | 103760702 A | 4/2014 |

(Continued)

*Primary Examiner* — Peet Dhillon

(74) *Attorney, Agent, or Firm* — Seed IP Law Group LLP

(57) ABSTRACT

A stereoscopic display device having a barrier panel is provided. The barrier panel may include lower channels between a lower barrier substrate and a channel insulating layer. The lower channels may be disposed between upper channels which is disposed on the channel insulating layer. Each of the lower channels may include a first sub-channel, a second sub-channel and a lower insulating layer. The lower insulating layer of each lower channel may cover an end region of the first sub-channel of adjacent lower channel. The second sub-channel of each lower channel may be connected to another end region of the first sub-channel. The second sub-channel may be extended along a side wall of the lower insulating layer. Thus, in the stereoscopic display device of the present disclosure, a distance between the lower channels may be minimized.

6 Claims, 9 Drawing Sheets

(56) References Cited

U.S. PATENT DOCUMENTS

2016/0291358 A1\* 10/2016 Kikuchi .................. G02B 30/27
2018/0205942 A1\* 7/2018 Smith ............... G02F 1/134309

FOREIGN PATENT DOCUMENTS

| CN | 105745570 A | 7/2016 |
| GB | 2540376 A | 1/2017 |
| JP | 2001-148870 A | 5/2001 |
| JP | 2003-140174 A | 5/2003 |
| JP | 2003-149621 A | 5/2003 |
| JP | 2013-070373 A | 4/2013 |
| JP | 2013-182187 A | 9/2013 |
| JP | 2016-191890 A | 11/2016 |
| JP | 2018-522276 A | 8/2018 |
| WO | 2017/010104 A1 | 1/2017 |

\* cited by examiner

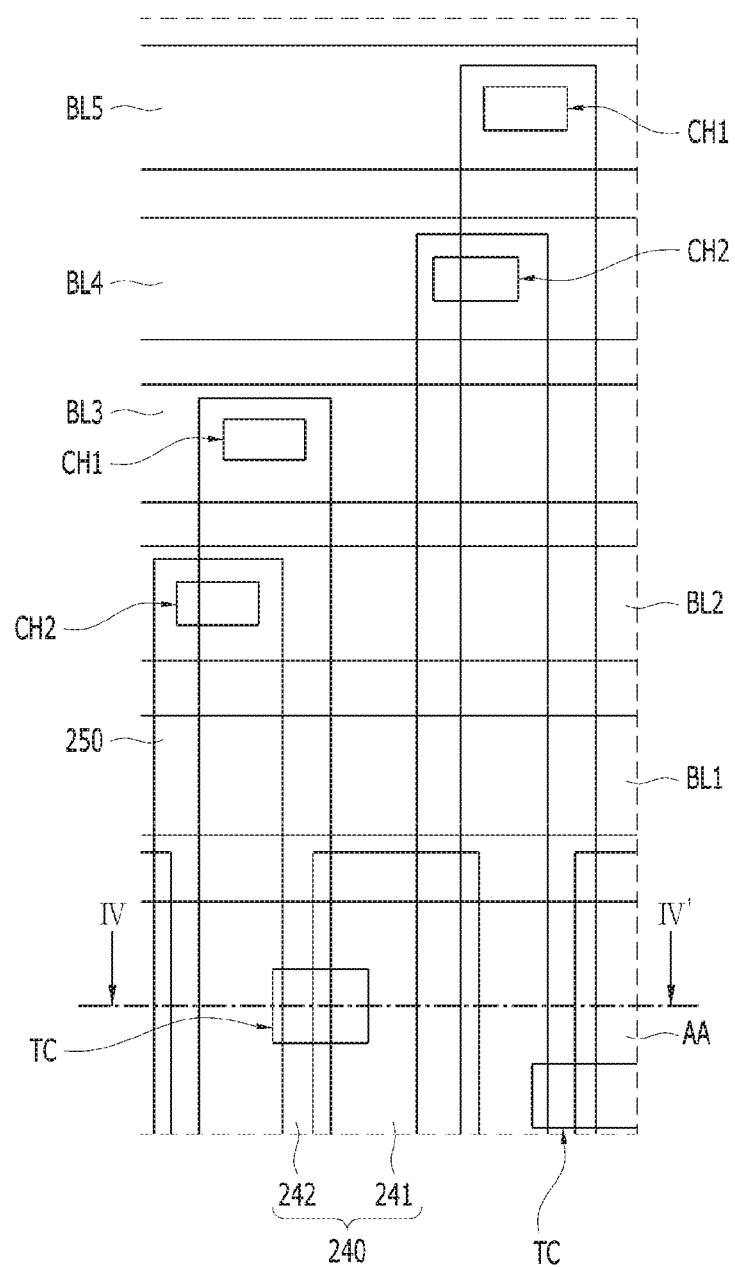

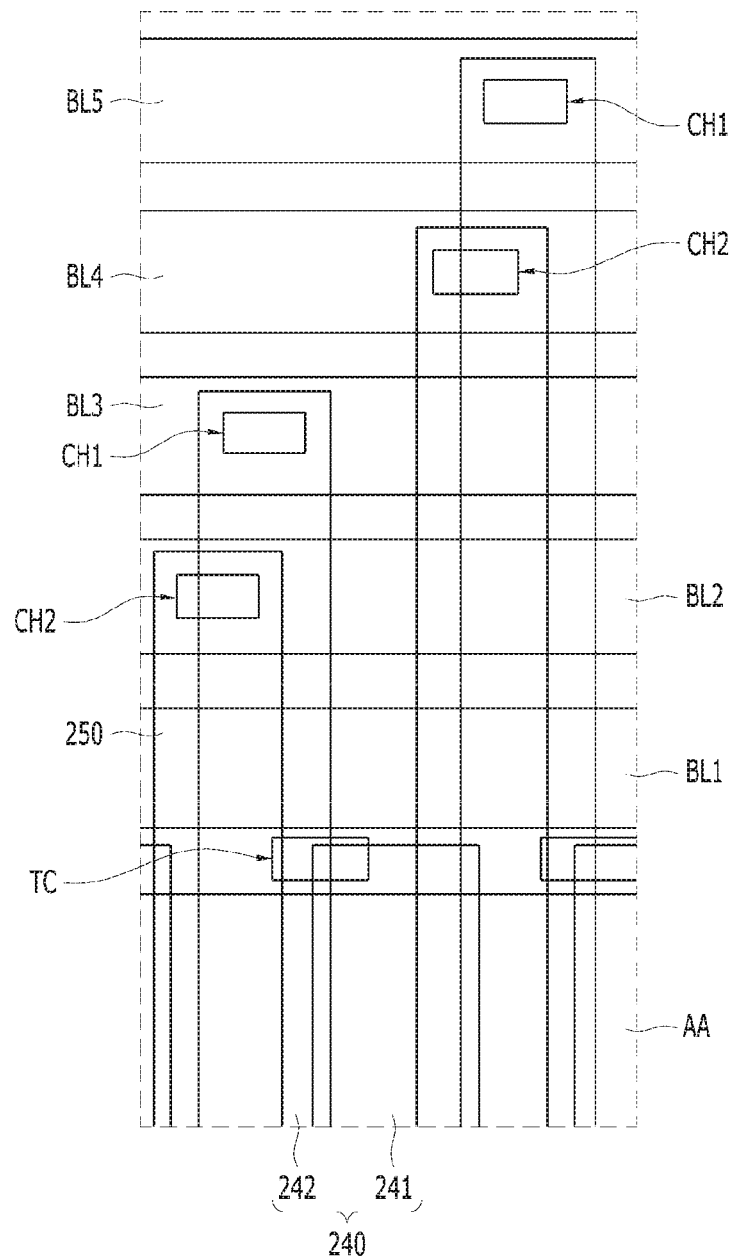

STEREOSCOPIC DISPLAY DEVICE HAVING A BARRIER PANEL

CROSS-REFERENCE TO RELATED APPLICATION(S)

This application claims the priority benefit of Korean Patent Application No. 10-2017-0144062, filed on Oct. 31, 2017, which is hereby incorporated by reference as if fully set forth herein.

BACKGROUND

Technical Field

The present disclosure relates to a stereoscopic display device realizing a stereoscopic image by using a barrier panel.

Description of the Related Art

Generally, a display device includes a display panel realizing an image. For example, the display device may include a liquid crystal panel having a liquid crystal, and/or an OLED panel having an organic light-emitting element.

The display device may realize a stereoscopic image using the binocular disparity. For example, a stereoscopic display device may provide an image realized by the display panel to the left eye and the right eye of viewer, differently. The stereoscopic display device may use a barrier panel to separate the image realized by the display panel.

The barrier panel may include channel electrodes disposed side by side to form transmitting regions and blocking regions. Each of the blocking regions may be disposed between the transmitting regions. For example, the barrier panel may further include a barrier liquid crystal which is rotated by a voltage applied to the channel electrodes.

The barrier panel may move a proper viewing range for the stereoscopic image according to the location of the viewer. For example, the barrier panel may move the transmitting regions and the blocking regions according to the location of the viewer, by adjusting a voltage applied to each channel electrode. Thus, in the stereoscopic display device, when a distance between the channel electrodes is narrow, the proper viewing range may be naturally moved according to the location of the viewer. In the stereoscopic display device, each channel electrode must be sufficiently insulated from adjacent channel electrodes in order to prevent malfunction due to a voltage applied to adjacent channel electrodes. Therefore, in the stereoscopic display device, the channel electrodes may be formed in a multi-layer structure to reduce a distance between the channel electrodes.

However, a step of forming the channel electrodes includes a patterning process. Thus, when the number of stacked channel electrodes increases, a method of forming the stereoscopic display device may be complicated. And, since the possibility of misalignment may increase in proportion to the number of stacked channel electrodes, the process efficiency of the stereoscopic display device may be decreased.

BRIEF SUMMARY

Accordingly, the present disclosure is directed to a stereoscopic display device that substantially obviates one or more problems due to limitations and disadvantages of the related art.

An object of the present disclosure is to provide a stereoscopic display device in which the number of the stacked channel electrodes may be minimized with a proper viewing range smoothly moved according to the location of the viewer.

Another object of the present disclosure is to provide a stereoscopic display device capable of minimizing a distance between channel electrodes arranged at regular intervals.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a stereoscopic display device including a display driver driving a display panel. A barrier panel is disposed on the display panel. The barrier panel includes lower channels, a channel insulating layer and upper channels, which are sequentially stacked on a barrier substrate. The lower channels and the upper channels are controlled by a barrier driver. Each of the lower channels is disposed between the upper channels. Each of the lower channels includes a first sub-channel, a second sub-channel and a lower insulating layer. The second sub-channel includes a first end region connected to the first sub-channel. The lower insulating layer is disposed between the barrier substrate and a second end region of the second sub-channel.

A distance between the upper channels may be the same as a horizontal width of each upper channel.

The lower insulating layer of each lower channel may partially cover the first sub-channel of adjacent lower channel.

The first end region of the second sub-channel may be in direct contact with an upper surface of the corresponding first sub-channel facing the upper channels.

The second end region of the second sub-channel may overlap a portion of the first sub-channel of adjacent lower channel.

A horizontal length of the second end region may be the same as a horizontal length of the first end region.

The location of the viewer may be detected by a viewing location detecting part. The barrier driver may adjust a voltage applied to the lower channels and the upper channels according to a signal of the viewing location detecting part.

The display panel may include a lower display substrate, a lower emission electrode, a light-emitting layer, an upper emission electrode and an upper display substrate, which are sequentially stacked.

In another embodiment, a stereoscopic display device includes a lower barrier substrate on a display panel. The lower barrier substrate includes an active area and a peripheral area. The peripheral area is disposed outside the active area. Upper channels and lower channels are disposed on the lower barrier substrate. Each of the lower channels is disposed between the upper channels. The upper channels and the lower channels cross the active area. Each of the lower channels includes a first sub-channel, a second sub-channel and a lower insulating layer. The lower insulating layer is disposed between the first sub-channel and the second sub-channel. The lower insulating layer includes lower contact holes exposing an end region of each first sub-channel. Each of the second sub-channels is extended along a side wall of the corresponding lower contact hole between the first sub-channels to be connected to the end region of the corresponding first sub-channel.

Each of the lower contact holes may include a first side wall overlapping with the corresponding first sub-channel, and a second side wall being spaced away from the corresponding first sub-channel. Each of the second sub-channels may include a first end region being in contact with the corresponding first sub-channel, a second end region on the lower insulating layer, and a center region between the first end region and the second end region. The center region may include a portion disposed on the second side wall of the corresponding lower contact hole.

Link lines may be disposed on the peripheral area of the lower barrier substrate. The link lines may be extended along an edge of the active area. Each of the upper channels and the lower channels may be connected to the link lines different from each other.

Each of the link lines may be an asymmetric shape with respective to the center of the active area.

The lower insulating layer may be extended on the peripheral area of the lower barrier substrate. The link lines may be covered by the lower insulating layer.

The link lines may include a material different from the first sub-channels.

The lower contact holes may be disposed on the peripheral area of the lower barrier substrate.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 5, 6A and 7 to 9 are views respectively showing the display device according to another embodiment of the present disclosure.

DETAILED DESCRIPTION

Figure 1:
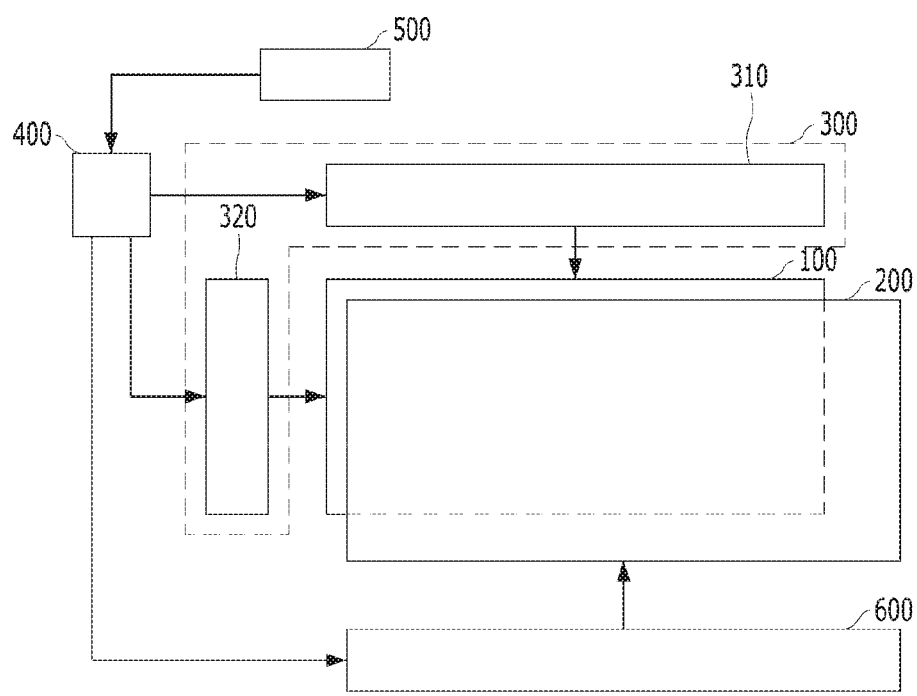
FIG. 1 is a view schematically showing a stereoscopic display device according to an embodiment of the present disclosure.

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical sprit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 2A:
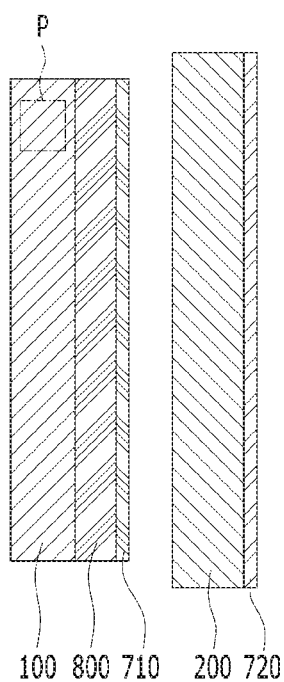
FIG. 2A is a view showing a display panel and a barrier panel of the stereoscopic display device according to the embodiment of the present disclosure.
Figure 2B:
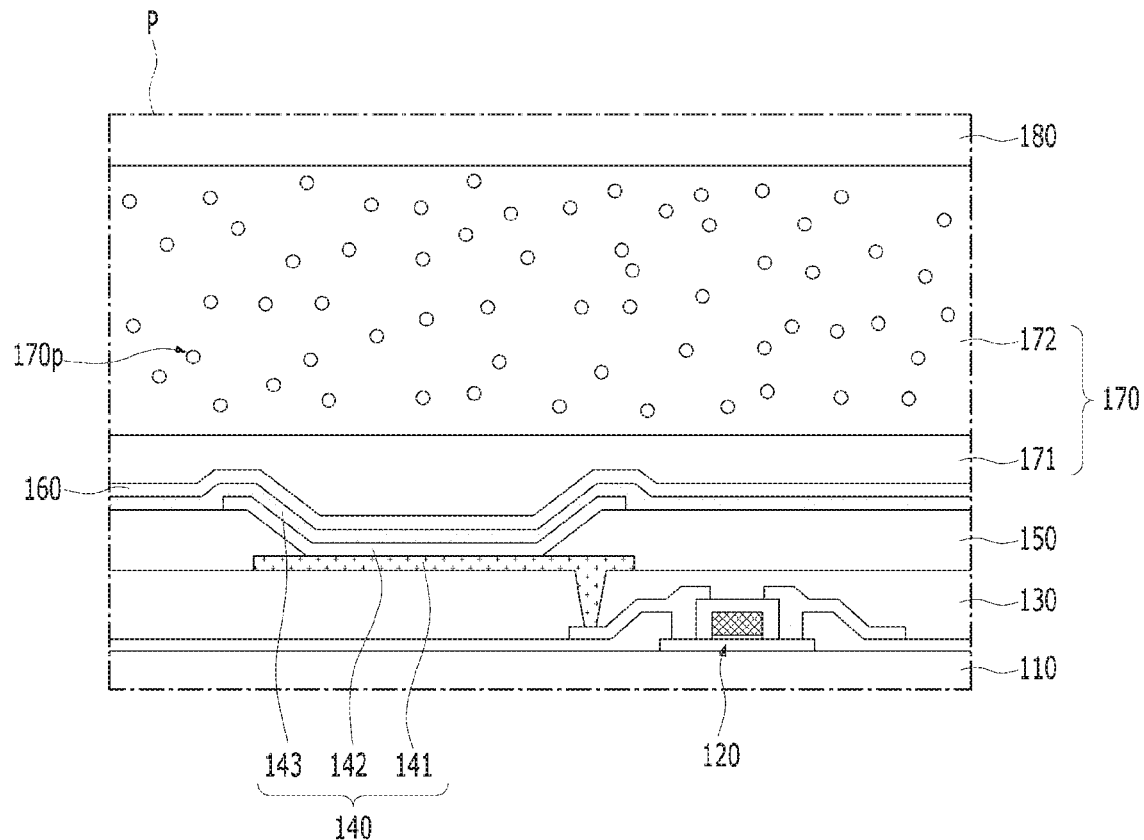
FIG. 2B is an enlarged view of P region in FIG. 2A.
Figure 3A:
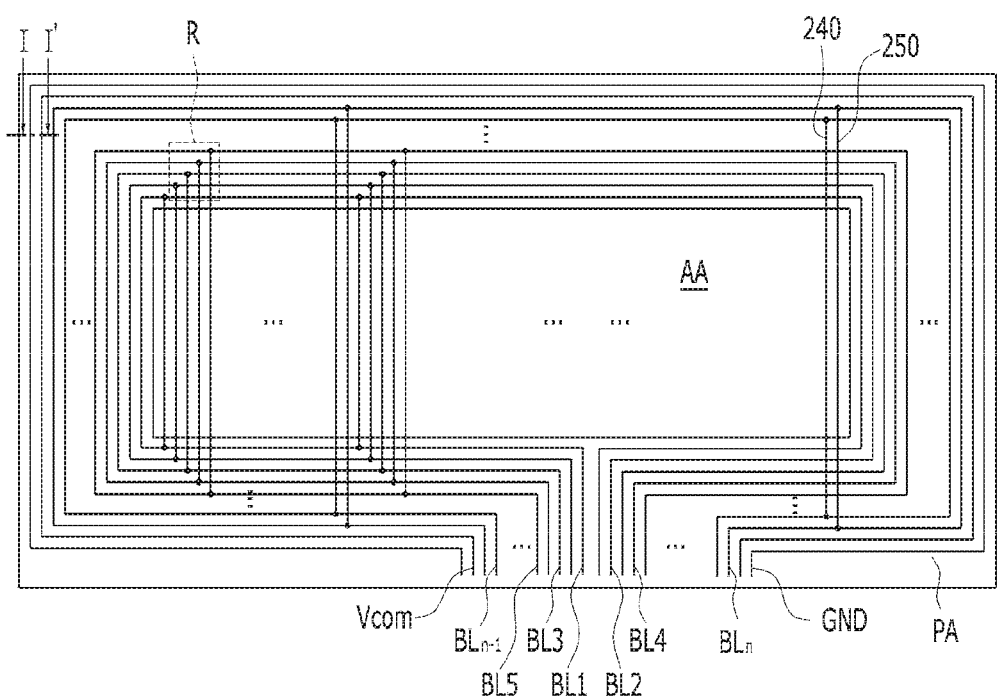
FIG. 3A is a view schematically showing wiring lines in the barrier panel of the stereoscopic display device according to the embodiment of the present disclosure.
Figure 3B:
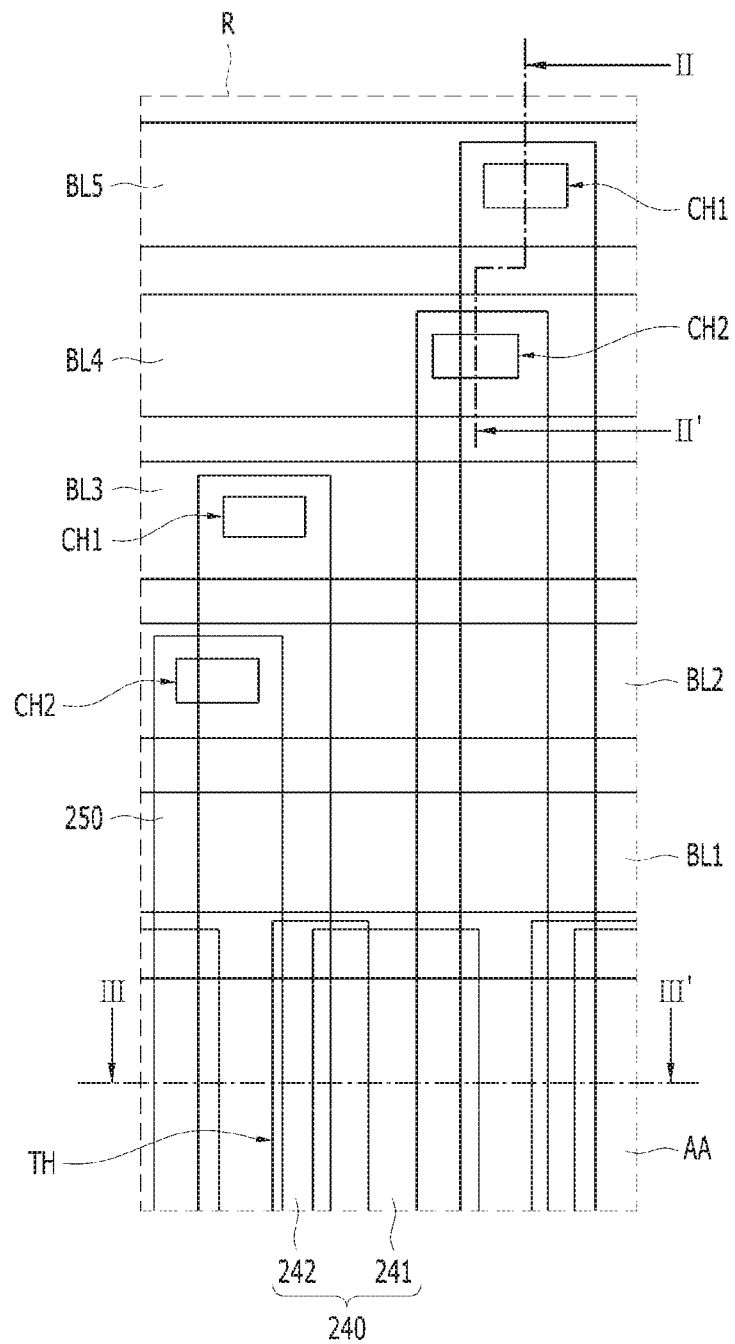
FIG. 3B is an enlarged view of R region in FIG. 3A.
Figure 4A:
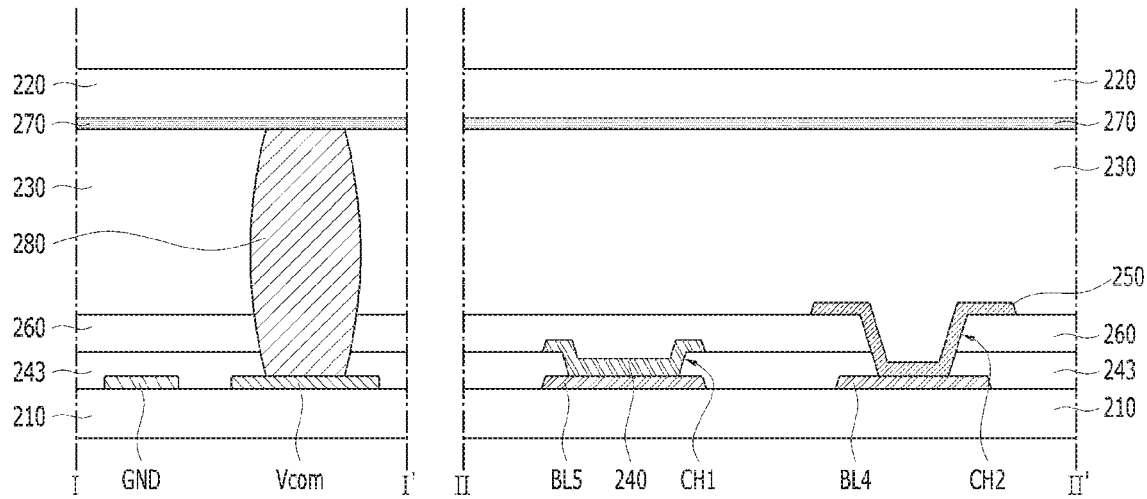
FIG. 4A is a view taken along I-I' of FIG. 3A and II-II' of FIG. 3B.
Figure 4B:
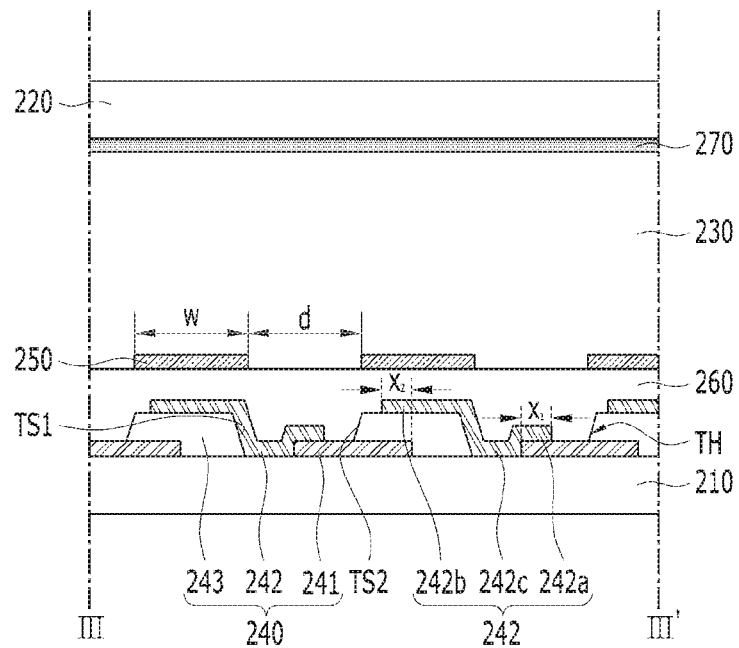
FIG. 4B is a view taken along III-III' of FIG. 3B.

FIG. 1 is a view schematically showing a stereoscopic display device according to an embodiment of the present disclosure. FIG. 2A is a view showing a display panel and a barrier panel of the stereoscopic display device according to the embodiment of the present disclosure. FIG. 2B is an enlarged view of P region in FIG. 2A. FIG. 3A is a view schematically showing wiring lines in the barrier panel of the stereoscopic display device according to the embodiment of the present disclosure. FIG. 3B is an enlarged view of R region in FIG. 3A. FIG. 4A is a view taken along I-I' of FIG. 3A and II-II' of FIG. 3B. FIG. 4B is a view taken along III-III' of FIG. 3B.

Referring FIGS. 1, 2A to 4A and 2B to 4B, the stereoscopic display device according to the embodiment of the present disclosure may comprise a display panel 100, a barrier panel 200, a display driver 300 and a barrier driver 600.

The display panel 100 may realize an image which is provided to a viewer. For example, the display panel 100 may include a lower display substrate 110, a light-emitting element 140 and an upper display substrate 180, which are sequentially stacked. The light-emitting element 140 may emit light displaying a specific color to realize the image. For example, the light-emitting element 140 may include a lower emission electrode 141, a light-emitting layer 142 and an upper emission electrode 143, which are sequentially stacked. The light-emitting layer 142 may generate light having luminance corresponding to a voltage difference between the lower emission electrode 141 and the upper emission electrode 143. The light-emitting layer 142 may include an organic emission material or an inorganic emission material. For example, the display panel 100 of the stereoscopic display device according to the embodiment of the present disclosure may be an OLED panel including an organic light-emitting element.

The display panel 100 may further include a thin film transistor 120 between the lower display substrate 110 and the light-emitting element 140, and an over-coat layer 130 covering the thin film transistor 120. The light-emitting element 140 may be controlled by the thin film transistor 120. The over-coat layer 130 may remove a thickness difference due to the thin film transistor 120. The over-coat layer 130 may be disposed between the thin film transistor 120 and the light-emitting element 140. For example, the over-coat layer 130 may include a contact hole for electrically connecting the lower emission electrode 141 to the thin film transistor 120.

The display panel 100 may further include a bank insulating layer 150 covering an edge of the lower emission electrode 141. The bank insulating layer 150 may insulate the lower emission electrode 141 of each light-emitting element 140 from the lower emission electrode 141 of adjacent light-emitting element 140. Thus, the display panel 100 of the stereoscopic display device according to the embodiment of the present disclosure may include a plurality of the light-emitting element 140 which are independently driven.

The display panel 100 may further comprise an upper passivation layer 160 and an encapsulating layer 170 which are disposed between the light-emitting element 140 and the upper display substrate 180. The upper passivation layer 160 may prevent the damage of the light-emitting element 140 due to the external impact and moisture. The encapsulating layer 170 may be disposed between the upper passivation layer 160 and the upper display substrate 180. The upper display substrate 180 may be coupled to the lower display substrate 110 on which the upper passivation layer 160 is formed, by the encapsulating layer 170. The encapsulating layer 170 may have a multi-layer structure. For example, the encapsulating layer 170 may include a lower encapsulating layer 171 and an upper encapsulating layer 172. The upper encapsulating layer 172 may include a moisture-absorbing material 170p. The lower encapsulating layer 171 may be disposed between the upper passivation layer 160 and the upper encapsulating layer 172. Thus, in the display panel 100 of the stereoscopic display device according to the embodiment of the present disclosure, the stress applied to the light-emitting element 140 due to the expansion of the moisture-absorbing material 170p may be relieved by the lower encapsulating layer 171.

The barrier panel 200 may be disposed on the display panel 100. The barrier panel 200 may separate the image realized by the display panel 100. For example, the image providing to the left eye of the viewer may be different from the image providing to the right eye of the viewer, by the barrier panel 200. That is, the image realized by the display panel 100 may be stereoscopically recognized to the viewer by the barrier panel 200.

The barrier panel 200 may transmit or block the light, selectively. For example, the barrier panel 200 may include a lower barrier substrate 210, an upper barrier substrate 220, a barrier liquid crystal layer 230, lower channels 240, upper channels 250, a channel insulating layer 260 and a common electrode 270.

The lower barrier substrate 210 may be disposed close to the display panel 100. For example, the lower barrier substrate 210 may be disposed on the upper display substrate 180 of the display panel 100.

The lower barrier substrate 210 may include an active area AA and a peripheral area PA. The image realized by the display panel 100 may be separated in the active area AA. For example, transmitting regions and blocking regions may be disposed in the active area AA. The peripheral area PA may be disposed outside the active area AA. For example, the active area AA may be surrounded by the peripheral area PA. The peripheral area PA may be a light-blocking region.

The lower barrier substrate 210 may include an insulating material. The lower barrier substrate 210 may include a transparent material. For example, the lower barrier substrate 210 may include glass.

The upper barrier substrate 220 may be disposed on the lower barrier substrate 210. The upper barrier substrate 220 may be parallel with the lower barrier substrate 210. For example, the upper barrier substrate 220 may overlap the active area AA and the peripheral area PA of the lower barrier substrate 210.

The upper barrier substrate 220 may include an insulating material. The upper barrier substrate 220 may include a transparent material. The upper barrier substrate 220 may include a material same as the lower barrier substrate 210. For example, the upper barrier substrate 220 may include glass.

The barrier liquid crystal layer 230 may be disposed between the lower barrier substrate 210 and the upper barrier substrate 220. The transmissivity of the barrier liquid crystal layer 230 may be changed according to the electric field generated by the lower channels 240, the upper channels 250 and the common electrode 270. For example, the barrier liquid crystal layer 230 may include TN mode liquid crystal or ECB mode liquid crystal.

The lower channels 240 and the upper channels 250 may be disposed between the lower barrier substrate 210 and the barrier liquid crystal layer 230. The common electrode 270 may be disposed between the barrier liquid crystal layer 230 and the upper barrier substrate 220. The common electrode 270 may generate a vertical electric field with the lower channels 240 and the upper channels 250. Each of the lower channels 240 and the upper channels 250 may apply a vertical electric field to a specific region of the barrier liquid crystal layer 230. For example, each of the lower channels 240 may be disposed between the upper channels 250. The upper channels 250 may be insulated from the lower channels 240. For example, the channel insulating layer 260 may be disposed between the lower channels 240 and the upper channels 250. The liquid crystal in the barrier liquid crystal layer 230 may be rotated by the vertical electric field applied to the corresponding region. For example, a portion of the barrier liquid crystal layer 230 disposed between the common electrode 270 and the lower channels 240 or the upper channels 250 may function as the transmitting region or the blocking region according to a voltage applied to the corresponding lower channel 240 or the corresponding upper channel 250.

The lower channels 240 may be disposed close to the lower barrier substrate 210. For example, the lower channels 240 may be disposed between the lower barrier substrate 210 and the channel insulating layer 260. The lower channels 240 may have a stacking structure. For example, each of the lower channels 240 may include a first sub-channel 241, a second sub-channel 242 and a lower insulating layer 243.

The first sub-channel 241 may be disposed on the lower barrier substrate 210. For example, the first sub-channel 241 may be in direct contact with the lower barrier substrate 210. The first sub-channel 241 may be a flat shape parallel with the lower barrier substrate 210.

The first sub-channel 241 may include a conductive material. The first sub-channel 241 may include a transparent material. For example, the first sub-channel 241 may be formed of ITO or IZO.

The second sub-channel 242 may be extended from an end region of the first sub-channel 241 toward adjacent lower channel 240. For example, the second sub-channel 242 may include a first end region 242a connected to the first sub-channel 241, a second end region 242b opposite to the first end region 242a, and a center region 242c between the first end region 242a and the second end region 242b.

The first end region 242a may be in direct contact with the end region of the first sub-channel 241. For example, the first end region 242a may be in direct contact with an upper surface of the first sub-channel 241 facing the upper channels 250. The end region of the first sub-channel 241 may include a portion overlapping with the first end region 242a.

The second sub-channel 242 may include a conductive material. The second sub-channel 242 may include a transparent material. For example, the second sub-channel 242 may be formed of ITO or IZO. The second sub-channel 242 may include a material same as the first sub-channel 241.

The lower insulating layer 243 may be spaced away from the corresponding firs sub-channel 241. For example, the lower insulating layer 243 may be disposed between the lower barrier substrate 210 and the second end region 242b of the second sub-channel 242. The center region 242c of the second sub-channel 242 may be extended along a first side wall TS1 of the lower insulating layer 243 facing the corresponding first sub-channel 241. That is, in the barrier panel 200 of the stereoscopic display device according to the embodiment of the present disclosure, an end region of each lower channel 240 may have a height different from another end region of the corresponding lower channel 240. Thus, the barrier panel 200 of the stereoscopic display device according to the embodiment of the present disclosure may reduce a distance between the adjacent lower channels 240 while sufficiently insulating between the lower channels 240.

The lower insulating layer 243 may include an insulating material. The lower insulating layer 243 may include a transparent material. For example, the lower insulating layer 243 may include silicon oxide or silicon nitride.

The lower insulating layer 243 may be extended on the first sub-channel 241 of adjacent lower channel 240. For example, the first sub-channel 241 of each lower channel 240 may be partially covered by the lower insulating layer 243 of adjacent lower channel 240. Each lower insulating layer 243 may include a second side wall TS2 overlapping with the first sub-channel 241 of adjacent lower channel 240.

The second end region 242b of the second sub-channel 242 may be disposed on an upper surface of the lower insulating layer 243 facing the upper channels 250. For example, the second side wall TS2 of each lower insulating layer 243 may be not covered by the corresponding second sub-channel 242. The second sub-channel 242 of each lower channel 240 may be insulated from the first sub-channel 241 of adjacent lower channel 240 by the corresponding lower insulating layer 243. Thus, in the barrier panel 200 of the stereoscopic display device according to the embodiment of the present disclosure, a horizontal distance between the second sub-channel 242 of each lower channel 240 and the first sub-channels 241 of adjacent lower channels 240 may be greatly reduced. Therefore, in the barrier panel 200 of the stereoscopic display device according to the embodiment of the present disclosure, a horizontal distance between adjacent lower channels 240 may be minimized.

The second end region 242b of the second sub-channel 242 may overlap a portion of the first sub-channel 241 of adjacent lower channel 240. That is, in the barrier panel 200 of the stereoscopic display device according to the embodiment of the present disclosure, the lay-out of adjacent lower channels 240 may partially overlap, as shown in FIG. 4B. Thus, the stereoscopic display device according to the embodiment of the present disclosure may prevent the occurrence of an un-controlled region which is not controlled by the lower channels 240 or the upper channels 250 in the barrier liquid crystal layer 230. Therefore, in the stereoscopic display device according to the embodiment of the present disclosure, a proper viewing range for the stereoscopic image may be smoothly moved according to the location of the viewer.

A horizontal length X2 of the second end region 242b may be the same as a horizontal length X1 of the first end region 242a. Thus, in the barrier panel 200 of the stereoscopic display device according to the embodiment of the present disclosure, the occurrence of an un-driven region in the barrier liquid crystal layer 230 may be prevented when the second sub-channel 242 and/or the upper channels 250 are misaligned. Therefore, in the stereoscopic display device according to the embodiment of the present disclosure, the process margin and the process efficiency may be improved.

The upper channels 250 may be disposed at regular intervals. A horizontal distance of the barrier liquid crystal layer 230 controlled by the each upper channel 250 may be the same as a horizontal distance of the barrier liquid crystal layer 230 controlled by the each lower channel 240. For example, a distance between the upper channels 250 may be the same as a horizontal width of each upper channel 250. Thus, in the barrier panel 200 of the stereoscopic display device according to the embodiment of the present disclosure, the transmitting regions and the blocking regions may be moved at equal intervals. Therefore, in the barrier panel 200 of the stereoscopic display device according to the embodiment of the present disclosure, the proper viewing range for the stereoscopic image may be moved at regular intervals according to the location of the viewer. That is, in the stereoscopic display device according to the embodiment of the present disclosure, the proper viewing range according to the location of the viewer may be smoothly moved.

The upper channels 250 may include a conductive material. The upper channels 250 may include a transparent material. For example, the upper channels 250 may be formed of ITO or IZO. The upper channels 250 may include a material same as the second sub-channel 242.

The channel insulating layer 260 may include an insulating material. The channel insulating layer 260 may include a transparent material. The channel insulating layer 260 may include a material having a refractive index similar to the lower insulating layer 243. For example, the channel insulating layer 260 may include a material same as the lower insulating layer 243.

The common electrode 270 may include a conductive material. The common electrode 270 may include a transparent material. For example, the common electrode 270 may be formed of ITO or IZO. The common electrode 270 may include a material same as the upper channels 250.

The lower channels 240 and the upper channels 250 may be extended in a direction. For example, the lower channels 240 and the upper channels 250 may cross the active area AA.

The barrier panel 200 of the stereoscopic display device according to the embodiment of the present disclosure may comprise link lines BL1-BLn disposed on the peripheral area PA. For example, the link lines BL1-BLn may be extended along an edge of the active area AA. Each of the link lines BL1-BLn may be connected to one of the lower channels 240 and the upper channels 250. For example, each of the lower channels 240 and the upper channels 250 may form a closed loop by being connected to the corresponding link line BL1-BLn.

The link lines BL1-BLn may be disposed close to the lower barrier substrate 210. For example, the link lines BL1-BLn may be in direct contact with the lower barrier substrate 210. The lower insulating layer 243 may be extended on the peripheral area PA of the lower barrier substrate 210. The link lines BL1-BLn may be covered by the lower insulating layer 243. The lower insulating layer 243 may include contact holes CH1 and CH2 exposing a portion of each link line BL1-BLn.

A horizontal length of the first sub-channel 241 may be smaller than a horizontal length of the second sub-channel 242. For example, each of the lower channels 240 may be connected to the corresponding link line BL1-BLn through the second sub-channel 242.

The link lines BL1-BLn may include a conductive material. The link lines BL1-Bln may have a resistance lower than the first sub-channel 241. For example, the link lines BL1-BLn may include a metal.

Wiring lines for supplying a power voltage may also be disposed on the peripheral area PA. For example, a common voltage supply line Vcom and a ground line GND may be disposed on the peripheral area PA. The common voltage supply line Vcom and the ground line GND may be disposed outside the link lines BL1-BLn. The common voltage supply line Vcom and the ground line GND may be extended along the link lines BL1-BLn. For example, the lower insulating layer 243 may cover the common voltage supply line Vcom and the ground line GND. The common voltage supply line Vcom may be connected to the common electrode 270. For example, a conductive sealing member 280 may be disposed between the common electrode 270 and the common voltage supply line Vcom. The conductive sealing member 280 may include a conductive sealing material. The conductive sealing member 280 may penetrate the lower insulating layer 243.

The display driver 300 may drive the display panel 100. The display panel 100 may receive signals for realizing the image from the display driver 300. For example, the display driver 300 may include a data driver 310 and a scan driver 320.

The data driver 310 may provide a data signal to the display panel 100. The scan driver 320 may sequentially provide a scan signal to the display panel 100. The data signal provided by the data driver 310 may be synchronized with the scan signal applied from the scan driver 320.

The stereoscopic display device according to the embodiment of the present disclosure may further comprise a timing controller 400 to provide a signal for the operation of the display drive 300. For example, the timing controller 400 may provide digital video data and source timing control signal to the data driver 310. The scan driver 320 may receive clock signals, reset clock signals and start signals from the timing controller 400.

The stereoscopic display device according to the embodiment of the present disclosure may further comprise a viewing location detecting part 500 detecting the location of the viewer. For example, the viewing location detecting part 500 may detect the position information of the viewer viewing the image realized by the display panel 100 and the barrier panel 200. The viewing location detecting part 500 may include a camera.

The barrier driver 600 may drive the barrier panel 200. For example, the barrier driver 600 may apply a voltage to the lower channels 240 and the upper channels 250, individually or region by region. The barrier driver 600 may control the barrier panel 200 according to the location of the viewer. For example, the barrier driver 600 may shift the transmitting regions and the blocking regions in the active area AA of the barrier panel 200 by adjusting the voltage applied to the lower channels 240 and the upper channels 250 according to the signal of the viewing location detecting part 500.

Accordingly, in the stereoscopic display device according to the embodiment of the present disclosure, the barrier panel 200 may include the lower channels 240 and the upper channels 250 for forming transmitting regions and blocking regions, and the both end region of each lower channel 240 may have different heights, so that a distance between adjacent lower channels 240 may be minimized. Thus, in the stereoscopic display device according to the embodiment of the present disclosure, the proper viewing range for stereoscopic image may be naturally moved according to the location of the viewer without the decrease of the process efficiency. Thereby, in the stereoscopic display device according to the embodiment of the present disclosure, the quality of the stereoscopic image may be increased.

In the stereoscopic display device according to the embodiment of the present disclosure, the link lines BL1-BLn being extended along the edge of the active area AA may be asymmetrically arranged with respect to the center of the active area AA. For example, in the stereoscopic display device according to the embodiment of the present disclosure, end portions of the link lines BL1-BLn connected to the barrier driver 600 may be slightly moved in the direction of a side surface of the barrier panel 200 from the center of the barrier panel 200, as shown in FIG. 3A. Thus, in the stereoscopic display device according to the embodiment of the present disclosure, the end portions of the link lines BL1-BLn connected to the barrier driver 600 may not affect the connection structure of the lower channels 240 and the upper channels 250. Therefore, in the stereoscopic display device according to the embodiment of the present disclosure, the efficiency of the forming process may be increased.

In the stereoscopic display device according to the embodiment of the present disclosure, the lower insulating layer 243 of the barrier panel 200 may include lower contact holes TH exposing an end portion of the first sub-channel 241 of each lower channel 240, and extending in the same direction as the lower channels 240. For example, in the stereoscopic display device according to the embodiment of the present disclosure, each of the lower contact hole TH may have a horizontal length longer than the corresponding first sub-channel 241, and shorter than the corresponding second sub-channel 242, as shown in FIG. 3B. The lower contact holes TH may have the same horizontal length. For example, in the stereoscopic display device according to the embodiment of the present disclosure, a horizontal length of the first sub-channel 241 of each lower channel 240 may be the same.

Figure 5:
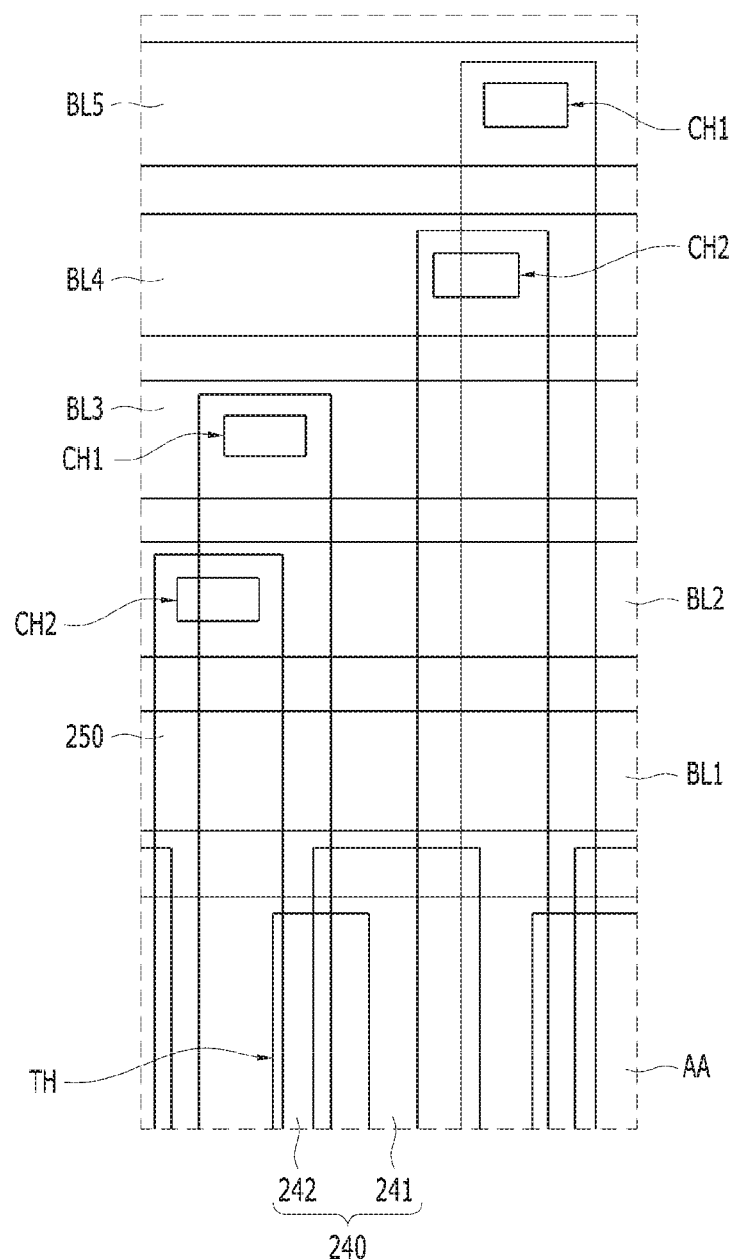

The stereoscopic display device according to the embodiment of the present disclosure is described that the barrier panel 200 includes the lower contact holes TH crossing the active area AA. However, the stereoscopic display device according to another embodiment of the present disclosure may include the lower contact holes TH of the lower insulating layer 243 having a horizontal length shorter than the corresponding first sub-channel 241. For example, in the stereoscopic display device according to another embodiment of the present disclosure, the lower insulating layer 243 of the barrier panel 200 may include the lower contact holes TH in the active area AA, as shown in FIG. 5. Thus, in the stereoscopic display device according to another embodiment of the present disclosure, each lower channel 240 may be insulated from the link lines BL1-BL5, reliably. Therefore, in the stereoscopic display device according to another embodiment of the present disclosure, the reliability for the operation of the barrier liquid crystal layer 230 may be increased.

Figure 6B:
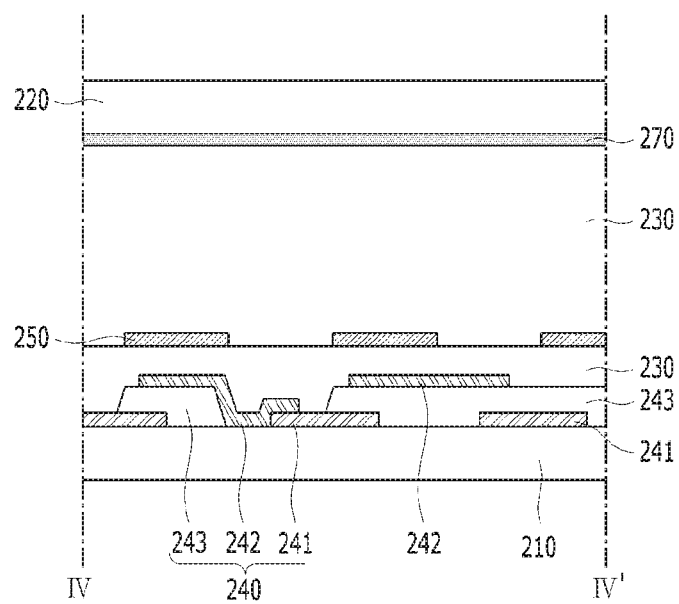
FIG. 6B is a view taken along IV-IV' of FIG. 6A.

The stereoscopic display device according to the embodiment of the present disclosure is described that the barrier panel 200 includes the lower contact holes TH having a trench shape. However, in the stereoscopic display device according to another embodiment of the present disclosure, the lower contact holes of the barrier panel 200 may partially expose an end portion of the corresponding first sub-channel 241 in the active area AA. For example, in the stereoscopic display device according to another embodiment of the present disclosure, the location of the lower contact hole TC may be different in the two adjacent lower channels 240. Thus, in the stereoscopic display device according to another embodiment of the present disclosure, the lower contact hole TC of each lower channel 240 may be freely arranged, as shown in FIGS. 6A and 6B. Thereby, in the stereoscopic display device according to another embodiment of the present disclosure, the process efficiency may be improved.

The stereoscopic display device according to the embodiment of the present disclosure is described that the lower contact holes TH of the barrier panel 200 includes a region disposed in the active area AA. However, the stereoscopic display device according to another embodiment of the present disclosure may include the lower contact holes on the peripheral area PA. For example, in the stereoscopic display device according to another embodiment of the present disclosure, the barrier panel 200 may include the lower contact holes TC disposed between the active area AA and the first link line BL1, as shown in FIG. 7. Thus, in the stereoscopic display device according to another embodiment of the present disclosure, the degree of freedom for the location of the lower contact holes TC may be increased. Also, the stereoscopic display device according to another embodiment of the present disclosure may prevent the variation of the transmittance due to the location of the lower contact hole TC. Therefore, in the stereoscopic display device according to another embodiment of the present disclosure, the process efficiency and the quality of the stereoscopic image may be improved.

The stereoscopic display device according to the embodiment of the present disclosure may further comprise a front linear polarizer 710, a rear linear polarizer 720 and a quarter-wave plate 800, as shown in FIG. 2A. The barrier panel 200 may be disposed between the front linear polarizer 710 and the rear linear polarizer 720. The quarter-wave plate 800 may be disposed between the display panel 100 and the front linear polarizer 710. For example, the quarter-wave plate 800 and the front linear polarizer 710 may be sequentially stacked on the display panel 100. Thus, in the stereoscopic display device according to the embodiment of the present disclosure, the reflection of the external light may be prevented. Therefore, in the stereoscopic display device according to the embodiment of the present disclosure, the quality of the stereoscopic image may be increased.

Figure 8:
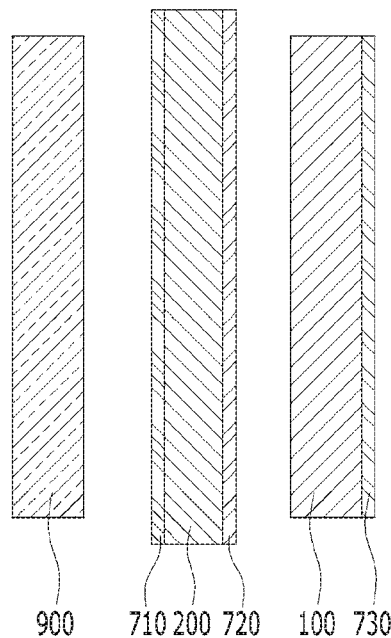

The stereoscopic display device according to the embodiment of the present disclosure is described that the barrier panel 200 is disposed on the display panel 100 including the light-emitting element 140. However, in the stereoscopic display device according to another embodiment of the present disclosure, the barrier panel 200 may be disposed between the display panel 100 and the light-emitting element 900, as shown in FIG. 8. For example, the display panel 100 of the stereoscopic display device according to another embodiment of the present disclosure may be a liquid crystal panel. The light-emitting element 900 may function as a backlight unit. The front linear polarizer 710 and the rear linear polarizer 720 may be in direct contact with the barrier panel 200. An image linear polarizer 730 may be disposed on an outer surface of the display panel 100. Thus, in the stereoscopic display device according to another embodiment of the present disclosure, the proper viewing range for the stereoscopic image may be smoothly moved according to the location of the viewer regardless of the relative position of the display panel 100 and the barrier panel 200.

Figure 9:
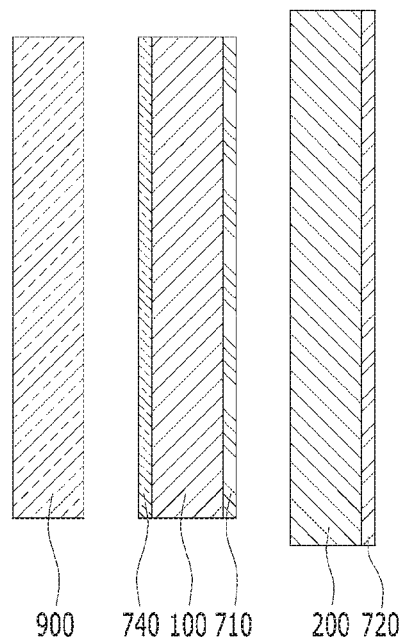

The stereoscopic display device according to another embodiment of the present disclosure is described that the barrier panel 200 is disposed between the light-emitting element 900 and the display panel 100. However, in the stereoscopic display device according to further another embodiment of the present disclosure, the display panel 100 may be disposed between the light-emitting element 900 and the barrier panel 200, as shown in FIG. 9. An image linear polarizer 740 may be disposed between the light-emitting element 900 and the display panel 100. The image linear polarizer 740 and the front linear polarizer 710 may be in direct contact with the display panel 100. Thus, in the stereoscopic display device according to further another embodiment of the present disclosure, the display panel 100 and the barrier panel 200 for providing the stereoscopic image to the moving viewer may have various positional relationships.

In the result, the stereoscopic display device according to the embodiments of the present disclosure may include the lower channels having the lower insulating layer between the lower barrier substrate and the end region of the corresponding second sub-channel. Thus, in the stereoscopic display device according to the embodiments of the present disclosure, the lower channels may be concentrated. That is, in the stereoscopic display device according to the embodiments of the present disclosure, the proper viewing range for the stereoscopic image may be naturally moved according to the location of the viewer without reducing the manufacturing yield. Therefore, in the stereoscopic display device according to the embodiments of the present disclosure, the quality of the stereoscopic image provided to the viewer may be increased.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stereoscopic display device comprising:
   a lower barrier substrate on a display panel, the lower barrier substrate including an active area and a peripheral area on the outside of the active area;
   lower channels on the lower barrier substrate, the lower channels crossing the active area;
   a channel insulating layer on the lower channels; and
   upper channels on the channel insulating layer and crossing the active area, each of the lower channels disposed between two adjacent upper channels,
   wherein the lower channels include first sub-channels, second sub-channels and a lower insulating layer between the first sub-channels and the second sub-channels,
   wherein the lower insulating layer includes a portion overlapping with the upper channels, and lower contact holes exposing an end region of each first sub-channel between the upper channels,
   wherein each of the lower contact holes includes a first side wall being spaced away from the corresponding first sub-channel and a second side wall overlapping with the corresponding first sub-channel,
   wherein each of the second sub-channels is connected to the end region of the corresponding first sub-channel between the upper channels by being extended along the first side wall of the corresponding lower contact hole and each of the second sub-channels includes a first end region connected to the corresponding first sub-channel, a second end region on the lower insulating layer, and a center region between the first end region and the second end region; and
   wherein a portion of the center region is disposed on the first side wall of the corresponding lower contact hole.

2. The stereoscopic display device according to claim 1, further comprising link lines on the peripheral area of the lower barrier substrate, the link lines extended along an edge of the active area,
   wherein the upper channels are connected to the link lines different from the link lines connected to the lower channels, respectively.

3. The stereoscopic display device according to claim 2, wherein the link lines have an asymmetric shape with respect to a center of the active area.

4. The stereoscopic display device according to claim 2, wherein the lower insulating layer is extended on the peripheral area of the lower barrier substrate, and
   wherein the link lines are covered by the lower insulating layer.

5. The stereoscopic display device according to claim 4, wherein the link lines include a material different from the first sub-channels.

6. The stereoscopic display device according to claim 1, wherein the lower contact hole is disposed on the peripheral area of the lower barrier substrate.

\* \* \* \* \*